Figure 1:
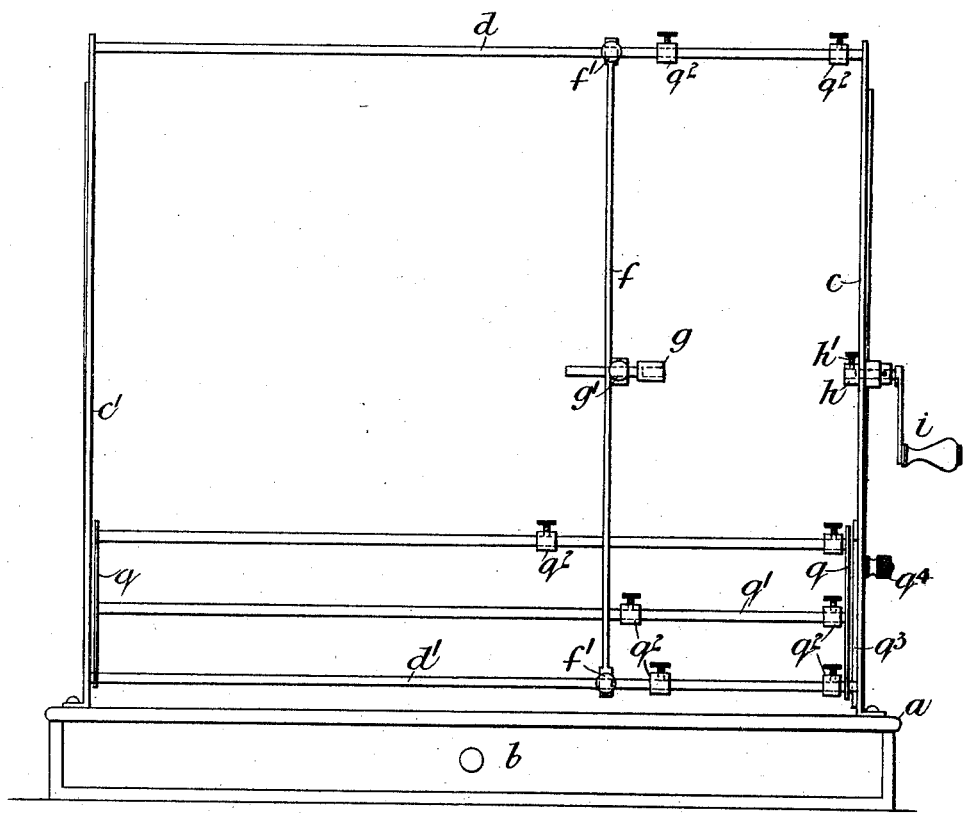
Figure 2:
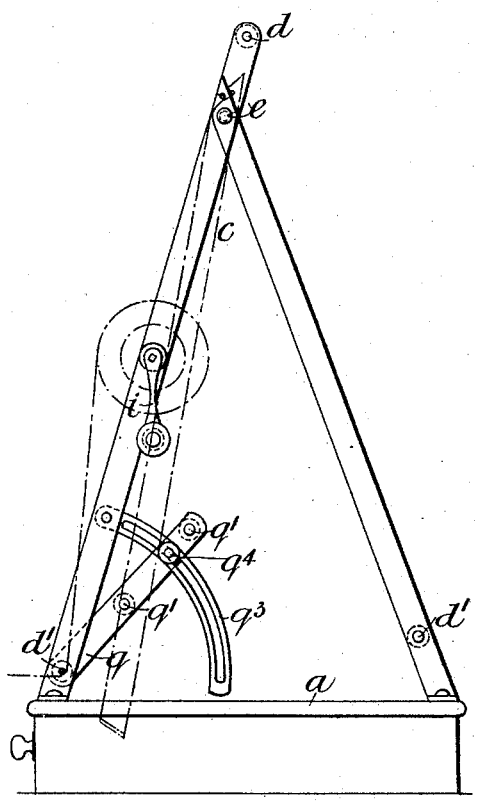
Figure 7:
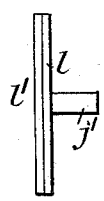
Figure 8:
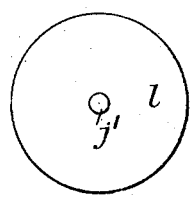
Figure 9:
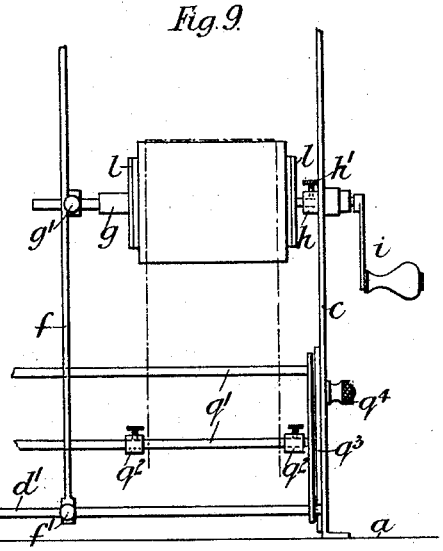
Figure 11:
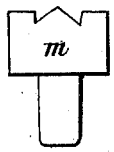
Figure 12:
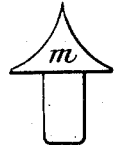
Figure 13:
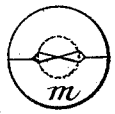
Figure 14:
Figure 15:
Figure 10:
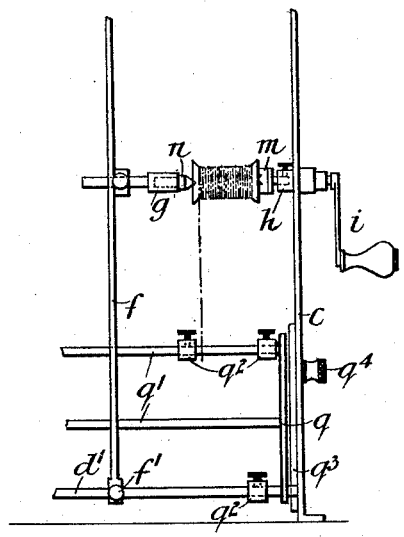

(No Model.) 5 Sheets—Sheet 2.
H. MARLEY.
MACHINE FOR WINDING RIBBONS, &c.

No. 469,524. Patented Feb. 23, 1892.

Witnesses. Inventor.

(No Model.) 5 Sheets—Sheet 3.
H. MARLEY.
MACHINE FOR WINDING RIBBONS, &c.
No. 469,524. Patented Feb. 23, 1892.
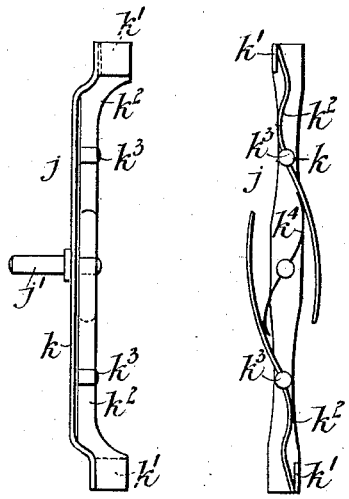
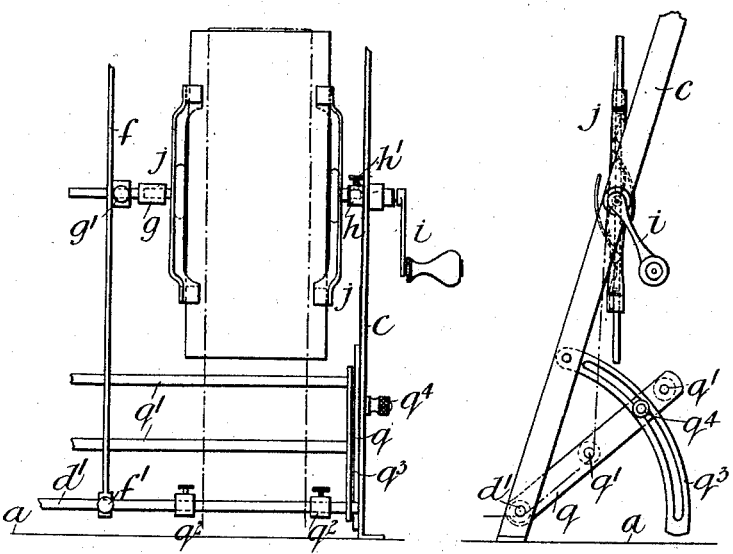

(No Model.) 5 Sheets—Sheet 4.

H. MARLEY.
MACHINE FOR WINDING RIBBONS, &c.

Witnesses.
Inventor.
Henry Marley
By his attys
Whitaker Prevost (No Model.) 5 Sheets—Sheet 5.
H. MARLEY.
MACHINE FOR WINDING RIBBONS, &c.
No. 469,524. Patented Feb. 23, 1892.
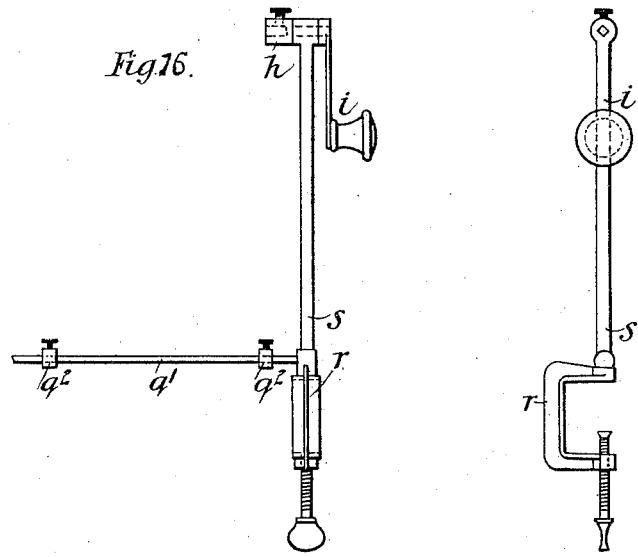

No. 469,524. Patented Feb. 23, 1892.